(12) United States Patent
Lee et al.

(10) Patent No.: US 8,340,444 B2
(45) Date of Patent: Dec. 25, 2012

(54) IMAGE ENCODING AND DECODING APPARATUS AND METHOD FOR EFFECTIVELY TRANSMITTING LARGE CAPACITY IMAGE

(75) Inventors: Jin Young Lee, Suwon-si (KR); Il Soon Lim, Hongseong-gun (KR); Du-sik Park, Suwon-si (KR); Jaejoon Lee, Seoul (KR); Ho Cheon Wey, Seongnam-si (KR); Seok Lee, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 428 days.

(21) Appl. No.: 12/662,532

(22) Filed: Apr. 21, 2010

(65) Prior Publication Data

US 2011/0026843 A1   Feb. 3, 2011

(30) Foreign Application Priority Data

Jul. 28, 2009   (KR) .................. 10-2009-0068930

(51) Int. Cl.
*G06K 9/36* (2006.01)
*G06K 9/46* (2006.01)

(52) U.S. Cl. .......... 382/238; 382/232; 382/233
(58) Field of Classification Search .......... None
See application file for complete search history.

(56) References Cited

U.S. PATENT DOCUMENTS

| 5,510,840 A | 4/1996 | Yonemitsu et al. |
| 2007/0076967 A1* | 4/2007 | Kim et al. ............. 382/239 |
| 2007/0230571 A1 | 10/2007 | Kodama |
| 2009/0257497 A1* | 10/2009 | Kazui ............. 375/240.16 |
| 2010/0118945 A1* | 5/2010 | Wada et al. ............. 375/240.12 |

FOREIGN PATENT DOCUMENTS

| JP | 2000-350213 | 12/2000 |
| JP | 2007-274479 | 10/2007 |
| KR | 10-208983 | 4/1999 |
| KR | 10-0260475 | 4/2000 |
| KR | 10-2009-0039689 | 4/2009 |
| WO | WO 93/13626 | 7/1993 |

* cited by examiner

*Primary Examiner* — Li Liu
(74) *Attorney, Agent, or Firm* — Staas & Halsey LLP

(57) ABSTRACT

Provided are an image encoding and decoding apparatus and method, which can effectively transmit a large capacity image. The image encoding apparatus generates a plurality of actual images with respect to an input image, and generates a difference image capable of predicting another actual image using one actual image, thereby effectively reducing an amount of data before encoding the input image.

27 Claims, 10 Drawing Sheets

IMAGE ENCODING AND DECODING APPARATUS AND METHOD FOR EFFECTIVELY TRANSMITTING LARGE CAPACITY IMAGE

CROSS-REFERENCE TO RELATED APPLICATIONS

This application claims the benefit of a Korean Patent Application No. 10-2009-0068930, filed on Jul. 28, 2009, in the Korean Intellectual Property Office, the disclosure of which is incorporated herein by reference.

BACKGROUND

1. Field

One or more embodiments relate to an image encoding/decoding apparatus and method, and more particularly, to an image encoding/decoding apparatus and method that may effectively transmit a large capacity image.

2. Description of the Related Art

With recent developments in image processing technologies, studies have been actively made for an Ultra High Definition television (UHDTV), and a three dimensional (3D) TV. Various broadcasting services focusing on a high definition television (HDTV) have been already provided in several nations. However, in order to meet the needs of users desiring clearer and more natural images, preparatory work for the UHDTV as a next-generation broadcasting service after the HDTV is under way. Also, as users increasingly require the use of interactive and tangible content, there has been an increased demand for a 3D TV service using a multi-point video technology as one area of 3D image processing technologies.

The importance of the UHDTV and the 3D TV is growing due to these changes in consumers' demands, however, the corresponding amount of data also increases due to the UHDTV having a size sixteen times larger than that of a HD screen size, and the 3D TV requiring at least two images with respect to one point. As a result, there arise problems when encoding image data using a conventional image compression method, in that such encoding schemes are not sufficiently efficient and require the transfer of potentially too much data. Accordingly, there is a demand for a method of effectively encoding/decoding a large capacity image data, for example for a successful use of the UHDTV and the 3D TV.

SUMMARY

According to one or more embodiments, there is provided an image encoding apparatus, including an image dividing unit to generate a plurality of actual images of respective areas divided from an input image, the respective areas being different from each other, an image filtering unit to predictive-filter each of the plurality of actual images using a predictive filter to generate a predicted image with respect to each of the plurality of actual images, an image operating unit to generate a difference image corresponding to each of the plurality of actual images based on respective comparisons of the predicted images and the actual images corresponding to the predicted images, an image selecting unit to select at least one difference image, of the generated difference images, based on respective data magnitudes of the difference images, and an image encoding unit to encode the selected difference image, a filter coefficient of the predictive filter corresponding to a predicted image used to generate the selected difference image, and an actual image, from among the plurality of actual images, in which a corresponding difference image is not selected by the image selecting unit.

According to one or more embodiments, there is provided an image encoder encoding a portion of an input image, a difference image corresponding to a comparison between the portion of the input image and a prediction of another portion of the input image derived from predictive filtering the portion of the input image, and a filter coefficient of a predictive filter performing the predictive filtering of the portion of the input image, such that a decoder regenerates the input image by predictive filtering a decoding of the portion of the input image, from a bitstream, based on the filter coefficient and adding the decoded portion of the input image to a combination of a decoding of the difference image, from the bitstream, and the predictive filtered decoded portion of the input image.

According to one or more embodiments, there is provided an image decoding apparatus, including an image decoding unit to decode an actual image, a difference image, and a filter coefficient of a predictive filter, with respect to an encoded input image represented by the actual image, the predictive filter to predictive-filter the actual image using the filter coefficient, an image operating unit to generate a summation image based on the predicted image and the difference image, and an image combination unit to combine the actual image and the summation image to regenerate the input image.

According to one or more embodiments, there is provided an image decoding apparatus, including an image decoding unit to decode an actual image and a filter coefficient of a predictive filter, with respect to an encoded input image represented by the actual image and another actual image not decoded, the predictive filter to predictive-filter the actual image using the filter coefficient to regenerate the other actual image, and an image operating unit to combine the actual image and the other actual image to regenerate the input image.

According to one or more embodiments, there is provided an image encoding method, including generating a plurality of actual images of respective areas divided from an input image, the respective areas being different from each other, predictive-filtering each of the plurality of actual images to generate a predicted image with respect to each of the plurality of actual images, generating a difference image corresponding to each of the plurality of actual images based on respective comparisons of the predicted images and the actual images corresponding to the predicted images, selecting at least one difference image, of the generated difference images, based on respective data magnitudes of the difference images, and encoding the selected difference image, a filter coefficient for predictive-filtering corresponding to a predicted image used to generate the selected difference image, and an actual image, from among the plurality of actual images, in which a corresponding difference image is not selected for encoding.

According to one or more embodiments, there is provided an image encoding method, including encoding a portion of an input image, a difference image corresponding to a comparison between the portion of the input image and a prediction of another portion of the input image derived from predictive filtering the portion of the input image, and a filter coefficient for performing the predictive filtering of the portion of the input image, such that a decoding method regenerates the input image by predictive filtering a decoding of the portion of the input image, from a bitstream, based on the filter coefficient and adding the decoded portion of the input image to a combination of a decoding of the difference image, from the bitstream, and the predictive filtered decoded portion of the input image.

According to one or more embodiments, there is provided an image decoding method, including decoding an actual image, a difference image, and a filter coefficient of a predictive filter, with respect to an encoded input image represented by the actual image, predictive-filtering the actual image using the filter coefficient, generating a summation image based on the predicted image and the difference image, and combining the actual image and the summation image to regenerate the input image.

According to one or more embodiments, there is provided an image decoding method, including decoding an actual image and a filter coefficient of a predictive filter, with respect to an encoded input image represented by the actual image and another actual image not decoded, predictive-filtering the actual image using the filter coefficient to regenerate the other actual image, and combining the actual image and the other actual image to regenerate the input image.

Additional aspects and/or advantages will be set forth in part in the description which follows and, in part, will be apparent from the description, or may be learned by practice of the invention.

BRIEF DESCRIPTION OF THE DRAWINGS

These and/or other aspects will become apparent and more readily appreciated from the following description of one or more embodiments, taken in conjunction with the accompanying drawings of which.

DETAILED DESCRIPTION

Figure 1:
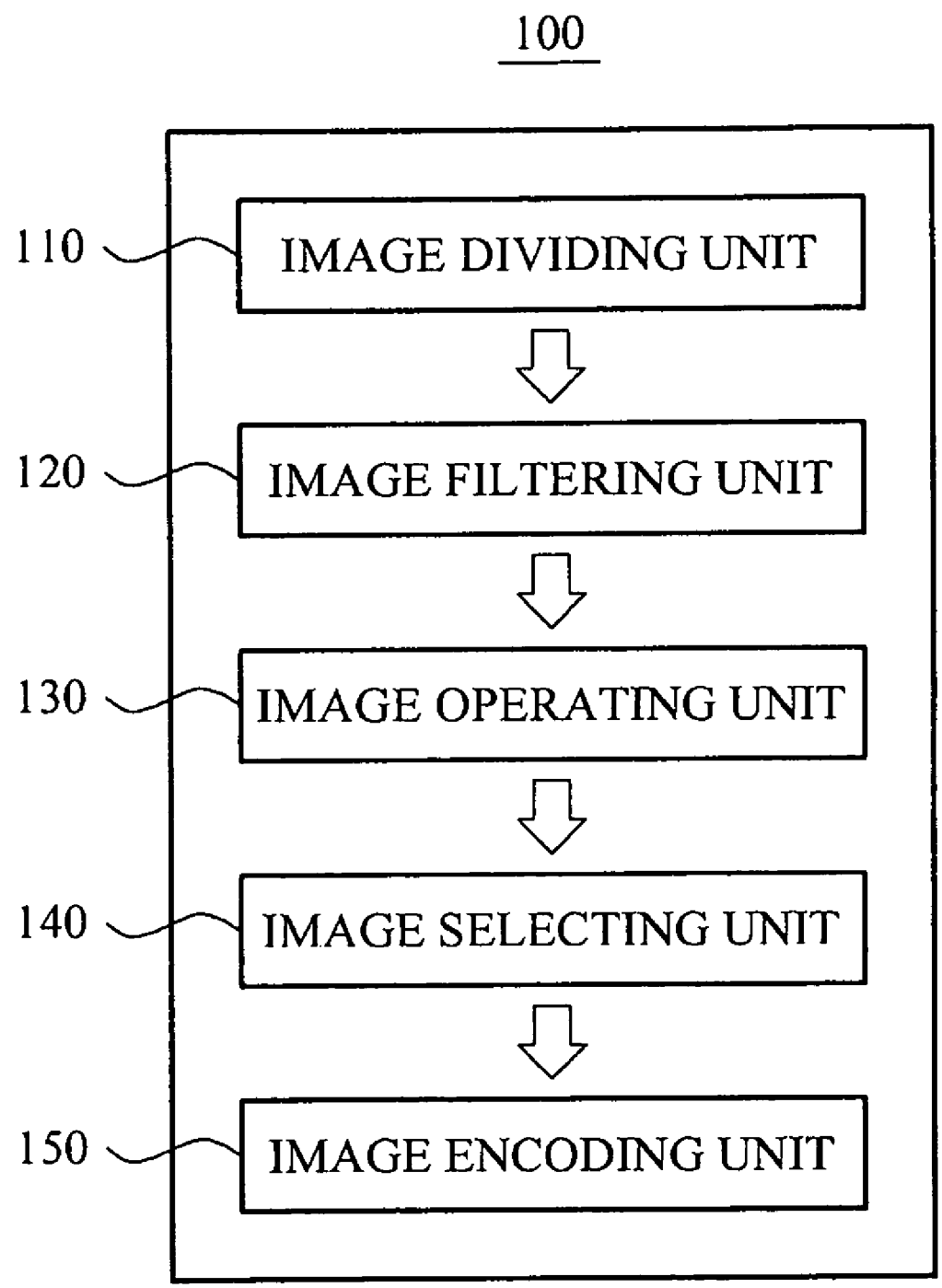
FIG. 1 is a block diagram illustrating an internal configuration of an image encoder, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram illustrating an internal configuration of an image encoder 100, according to one or more embodiments. Herein, throughout the following description, the terms encoder/encoding or decoder/decoding apparatuses should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available. Further, though embodiments may be directed toward an image encoding and decoding apparatus and method for effectively transmitting large capacity image, alternative applications of the same are equally available.

The image encoder 100 may include an image dividing unit 110, an image filtering unit 120, an image operating unit 130, an image selecting unit 140, and an image encoding unit 150, for example.

The image dividing unit 110 may divide or segment an input image into a plurality of areas to generate a plurality of actual images including respective areas of the plurality of areas. The term actual image means an image portion of the actual original image, such that if the separate image portions were to be combined, e.g., like a jigsaw puzzle, the original image could be reproduced. For example, if an image was separated into top and bottom portions, the top and bottom portions would be separate actual images and could be combined to again form the original image. Further, in an embodiment, if every other column or line were to be allotted to separate odd and even actual images, respectively, each column or line of each actual image could be sequentially combined, e.g., first column from the odd actual image, first column from the even actual image, second column form the odd actual image, etc. In addition, embodiments are not limited to the separation of the original image into the actual images, as additional image processing may be applied to the original image before separation, and/or additional image processing may be applied to the separated images, in combination with other aspects of the invention.

Thus, here, the respective areas may be different from each other, e.g., without overlap, as only an example. In this instance, the image dividing unit 110 may include a correlation checking unit to determine a direction where a correlation of pixel values of the input image is high using at least one of variance information and edge information with respect to the pixel values, and a field extracting unit to divide the input image into the plurality of areas based on the direction where the correlation is high, and to generate the plurality of actual images to enable areas adjacent to each other in the input image from among the plurality of areas to be included in the actual images being different from each other. For example, when the pixel values of the input image have a high correlation in a vertical or horizontal direction, the correlation checking unit may determine a direction where the correlation is high to be the vertical or horizontal direction. Thus, as noted above, the field extracting unit may divide the input image in the vertical or horizontal direction in a pixel unit to generate two actual images including each of an odd numbered column or line area or an even numbered column or line area. Though horizontal and vertical directions, and corresponding column or line areas, are described, embodiments are not limited to the same.

As describe above, a method of generating the plurality of actual images through the input image will be further described in greater detail with reference to FIGS. 5, 7, and 8. Hereinafter, for convenience of description, it is assumed that the input image is divided into two actual images, that is, an odd numbered image including the odd numbered columns or lines of the pixel unit and an even numbered image including the even numbered columns or lines of the pixel unit. That is, the input image may be divided into at least two actual images. Here, as noted, additional divided actual images are also available.

The image filtering unit 120 may predictive-filter each of the plurality of actual images using a predictive filter to generate respective predicted images for each of the plurality of actual images, each being different. For example, the actual odd numbered image and the actual even numbered image may be generated by dividing the input image by the image dividing unit 110, the image filtering unit 120 may predictive-filter the actual odd numbered image to generate a predicted even numbered image, and also predictive-filter the actual even numbered image to generate a predicted odd numbered image. Thus, for example, an image could be generated by combining the actual odd numbered image with the predicted even numbered image, or combining the actual even numbered image with the predicted odd numbered image. In this instance, the image filtering unit 120 may obtain a filter coefficient of the predictive filter, which can best predict each of the plurality of actual images, and adopt the predictive filter to which the filter coefficient is applied to generate the predicted image with respect to each of the plurality of actual images.

The image operating unit 130 may thus generate a difference image corresponding to each of the plurality of actual images using an operation performed utilizing a predicted image and an actual image corresponding to the predicted image, such as the aforementioned actual odd numbered image and the predicted even numbered image, or the actual even numbered image and the predicted odd numbered image. In this instance, the image operating unit 130 may generate the difference image using pixel values of mutually corresponding pixels in the input image with respect to the predicted image and the actual image. That is, the image operating unit 130 may generate, as the difference images, a result obtained by differentiating the pixel values of the mutually corresponding pixels from among pixel values of predicted images and pixel values of respective actual images. In this case, when the predicted even numbered image, generated using the actual odd numbered image, is completely identical to the actual even numbered image, the difference result may be zero. That is, as a performance of the predictive filter becomes more excellent, or optimized, e.g., through repetition operations, an amount of data of the difference image may be reduced, and a second actual image may be nearly completely restored using only a single actual image when performing a decoding with respect to the input image.

Here, for example, if a decoder were provided a first actual image (originally derived from a division of an original image into first and second actual images by an encoder), information about the predictive filter, and the difference image, the decoder could apply the appropriate predictive filter to the received first actual image to generate a predicted second image, the difference image could then be combined with the predicted second image to regenerate the second actual image, and the first actual image could then be combined with the regenerated second actual image to regenerate the original image. With this example, rather than having to provide the entire original image, or both first and second actual images, only the first actual image, information about the predictive filter, and the difference image need, potentially, to be provided.

Thus, the image operating unit 130 may generate respective difference images for different actual images from among the plurality of actual images. That is, in the above example, it is assumed that the odd numbered image and the even numbered image are generated as the plurality of actual images, and the predicted odd numbered image and the predicted even numbered image are generated through the even numbered image and the odd numbered images, respectively. In this instance, the image operating unit 130 may generate a difference odd numbered image using an operation performed utilizing the odd numbered image and the predicted odd numbered image, and also generate a difference even numbered image using an operation performed utilizing the even numbered image and the predicted even numbered image. Hereafter, the example actual odd numbered image and the actual even numbered image, i.e., the termed actual images, will be merely referred to as the odd numbered image and the even numbered image, respectively.

The image selecting unit 140 may select at least one difference image based on a data magnitude of the difference image. That is, the image selecting unit 140 may select the difference image having a smaller data magnitude from the difference odd numbered image and the difference even numbered image. Depending on which difference image is selected, a different actual image will be chosen for transmission, e.g., if the difference even numbered image is less than the difference odd numbered image, then the odd numbered image may be encoded, with the predictive filter information, and the difference even numbered image, rather than encoding the even numbered image with the corresponding predictive filter information and difference odd numbered image.

Accordingly, the image encoding unit 150 may encode the selected difference image, a filter coefficient of the predictive filter, and an actual image of which a corresponding difference image from among the plurality of actual images not selected. That is, the image encoding unit 150 may encode a portion of the actual images of the plurality of actual images, a difference image with respect to the remaining actual images, and the filter coefficient rather than encode the entire input image.

As another example, the image encoding unit 150 may encode the even numbered image, the difference odd numbered image, and the corresponding filter coefficient of the predictive filter when the difference odd numbered image is selected, and encode the odd numbered image, the difference even numbered image, and the corresponding filter coefficient of the predictive filter when the difference even numbered image is selected.

In this instance, the difference image may be an image obtained by differentiating the predicted image from the corresponding actual image. Here, the data magnitude of the difference image is less than that of the actual image, and the data magnitude of the filter coefficient is significantly less than those of the actual images. Accordingly, an amount of data to be transmitted may be reduced. For example, when the predicted image and the corresponding actual image are completely identical to each other, e.g., due to a significantly excellent performance of the predictive filter so that a magnitude of a difference image of the first actual image or the second actual image is zero, an encoding may be performed with respect to only one of the first actual image or the second actual image, alone with and the filter coefficient, thereby reducing an amount of data to be encoded by half.

In this instance, the image encoding unit 150 may further encode a division index, with respect to an input image from which the actual images are derived, indicating a direction having a high correlation and an image index designating each of the plurality of actual images. The division index and the image index may be used in verifying a direction in which the input image is divided in an image decoder according to embodiments, and in verifying which difference image with respect to which actual image is encoded.

Figure 2:
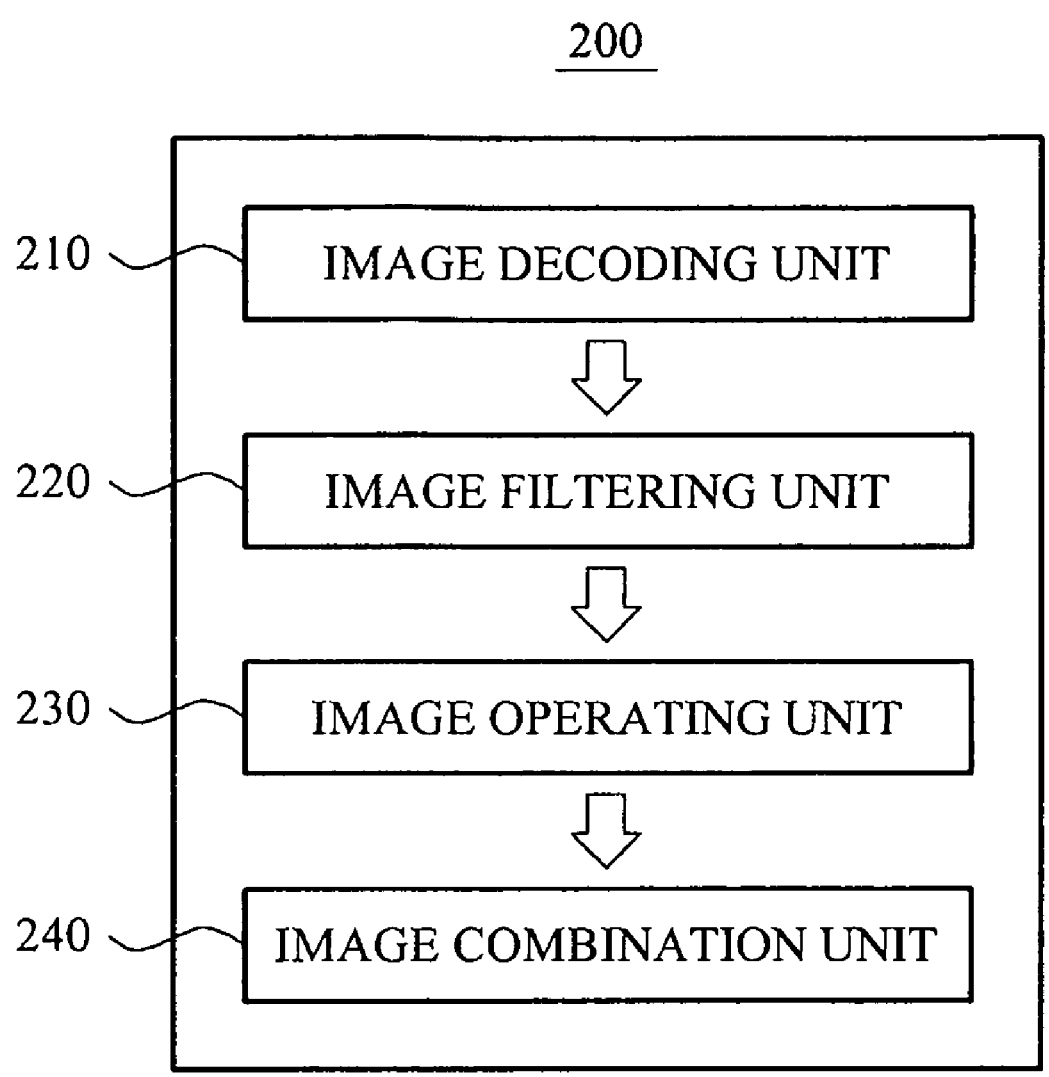
FIG. 2 is a block diagram illustrating an internal configuration of an image decoder, according to one or more embodiments.

FIG. 2 is a block diagram illustrating an internal configuration of an image decoder 200, according to one or more embodiments. As illustrated in FIG. 2, the image decoder 200 may include an image decoding unit 210, an image filtering unit 220, an image operating unit 230, and an image combination unit 240, for example.

The image decoding unit 210 may decode an actual image, a difference image, and a filter coefficient of a predictive filter with respect to an encoded input image. For example, the image decoding unit 210 may decode data encoded in the image encoder 100 illustrated in FIG. 1. In a similar manner as described with reference to FIG. 1, the image decoding unit may decode the even numbered image, the difference odd numbered image, and the corresponding filter coefficient of the predictive filter, or decode the odd numbered image, the difference even numbered image, and the corresponding filter coefficient of the predictive filter. In an embodiment, the actual image may include any one of an odd numbered image including an odd numbered column or line in a pixel unit and an even numbered image including an even numbered column or line in a pixel unit. Also, in an embodiment, the difference image may include a difference even numbered image when the encoded actual image is odd numbered image, and may include a difference odd numbered image when the encoded actual image is the even numbered image.

In this instance, the image encoder 100 of FIG. 1 may further encode the division index indicating a direction having a high correlation of pixel values of the input image and the image index designating each of the plurality of actual images, and the image decoding unit 210 may further decode the division index and the image index. That is, the image decoding unit 210 may verify a direction in which the input image is divided using the division index, and verify which image from among the plurality of actual images is encoded using the image index. For example, when the image index is expressed as {1, 2, 3, 4} indicating the plurality of actual images, and the image index expressed as {1, 3} is encoded, the image decoder 200 may verify that an actual image corresponding to '1' and '3' using a decoded {1, 3} is decoded and a difference image corresponding to '2' and '4' is decoded. In this instance, a predicted image corresponding to '2', derived from the actual image corresponding to '1', and a difference image corresponding to '2' would be images that correspond to each other. Accordingly, the actual image corresponding to '1' would further be adjacent to a decoder generated image corresponding to "2", derived from the predicted image corresponding to '2' and the difference image corresponding to '2', for example.

As a performance of the predictive filter becomes more optimized, the even numbered image may be accurately predicted using the encoded odd numbered image or the odd numbered image may be accurately predicted using the encoded even numbered image. That is, as the performance of the predictive filter becomes more optimized, a magnitude of the corresponding difference image may approach zero. Thus, when the difference image generated using the image encoder 100 approaches zero, a decoder may regenerate an actual image that was not encoded by primarily using a separate encoded actual image, thereby significantly reducing a magnitude of data to be encoded/decoded or transmitted.

That is, when a magnitude of the difference image is zero with respect to the input image in which two actual images are generated, the entire input image may be generated in a receiving end, even though only any one of the odd numbered image and the even numbered image, and the filter coefficient, are encoded and transmitted. The difference image may not need to be transmitted if zero, for example.

The image filtering unit 220 may verify an actual image, and predictive-filter the verified actual image in the predictive filter using the filter coefficient to generate a predicted image. Here, as noted below, the generated predicted image would thus be combinable with the received difference image to regenerate the non-transmitted actual image, which could then be combined with the verified actual image to regenerate the original whole image. For example, the image filtering unit 220 may predictive-filter the odd numbered image when the actual image is the odd numbered image, and may then generate a predicted even numbered image as the predicted image. Similarly, the image filtering unit 220 may predictive-filter the even numbered image when the actual image is the even numbered image, and may then generate a predicted odd numbered image as the predicted image.

Thus, the image operating unit 230 may generate a summation image using the predicted image and the difference image. For example, the image operating unit 230 may generate the summation image by either using a summation performed between a pixel value of the predicted even numbered image and a pixel value of the difference even numbered image, or using a summation performed between a pixel value of the predicted odd numbered image and a pixel value of the difference odd numbered image. That is, the summation image may regenerate or designate an original odd numbered image or an original even numbered image.

The image combination unit 240 may combine the actual image, i.e., the verified actual image, and the summation image to generate an original input image. That is, when the image decoding unit 210 decodes the odd numbered image, the difference even numbered image, and the filter coefficient, the image filtering unit 220 may generate a predicted even numbered image from the odd numbered image. In this instance, the image operating unit 230 may then generate, as the summation image, the generated even numbered image from the predicted even numbered image and the difference even numbered image. In this instance, the image combination unit 240 may generate the original input image by combining the odd numbered image and the generated even numbered image.

Figure 3:
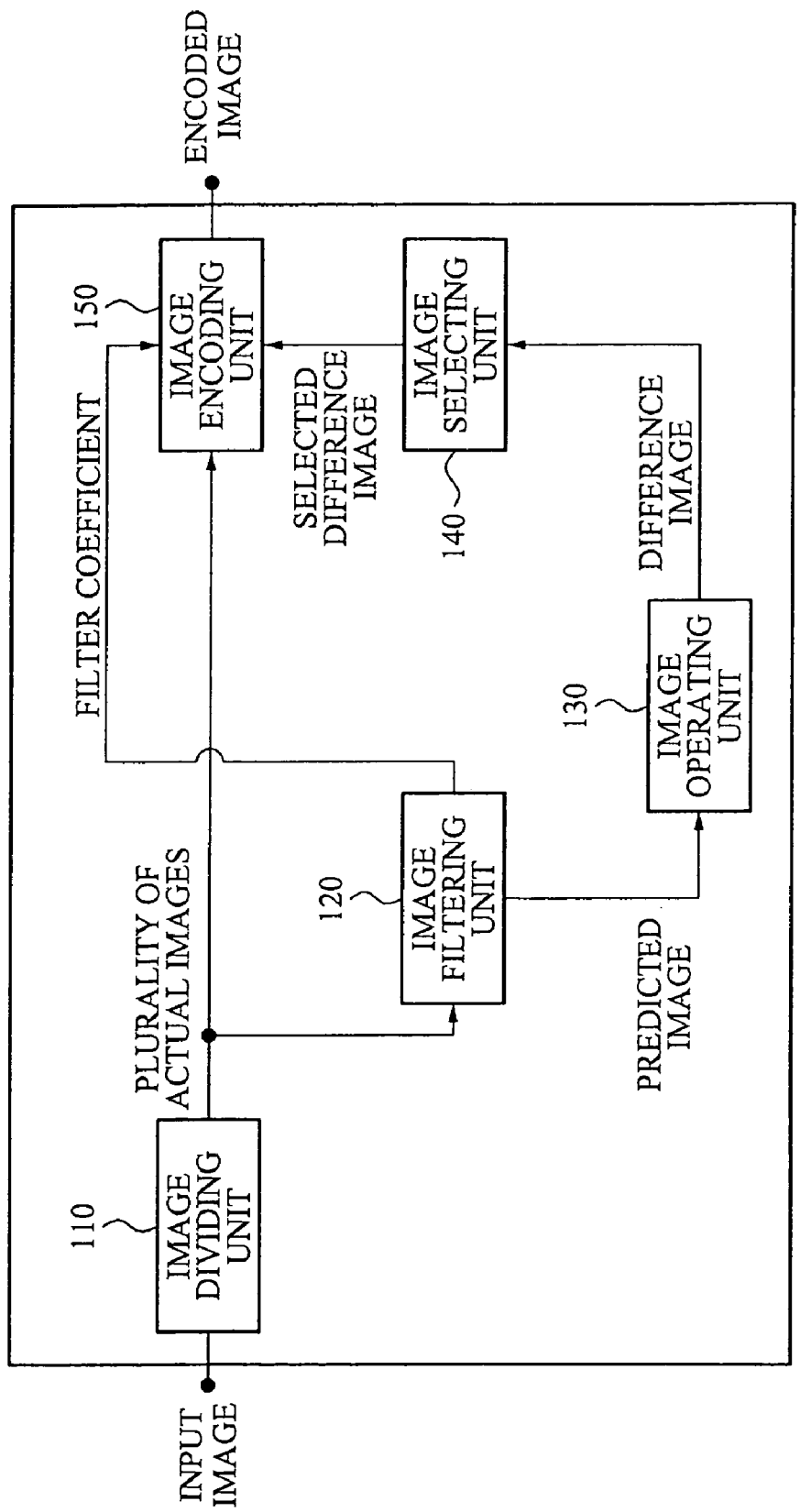
FIG. 3 illustrates an encoding apparatus, according to one or more embodiments.

FIG. 3 illustrates an encoding apparatus, according to one or more embodiments. FIG. 3 corresponds to the case wherein an input image is divided into an odd numbered column area and an even numbered column area in a pixel unit. In an embodiment, when the input image is input to the image encoder, the image dividing unit 110 may divide the input image into the odd numbered column area and the even numbered column area in the pixel unit, and generate an odd numbered image including the odd numbered column area and an even numbered image including the even numbered column area. In this instance, the image dividing unit 110 may also generate a division index indicating a vertical direction having a high correlation in pixel values of the input image.

In this instance, the image filtering unit 120 may predictive-filter each of the odd numbered image and the even numbered image by applying a predictive filter to each of the odd numbered image and the even numbered image, thereby generating a predicted odd numbered image and a predicted even numbered image as the predicted image. In this instance, as a filter coefficient of the predictive filter is optimized, the predicted odd numbered image may be nearly identical to the odd numbered image, and/or the predicted even numbered image may be nearly identical to the even numbered image.

After the predicted odd numbered image and the predicted even numbered image are generated, the image operating unit 130 may differentiate the odd numbered image and the predicted odd numbered image to generate a difference odd numbered image, and also differentiate the even numbered image and the predicted even numbered image to generate a difference even numbered image. In this instance, as the filter coefficient of the predictive filter is optimized, the difference odd numbered image and the difference even numbered image may have a value nearly approaching zero.

Next, the image selecting unit 140 may select any one of the difference odd numbered image and the difference even numbered image based on respective data magnitudes, and the image encoding unit 150 may determine data to be encoded based on the selected difference image, and encode the determined data. For example, when the difference odd numbered image is selected in the image selecting unit 140, the image encoding unit 150 may encode the even numbered image, the difference odd numbered image, and the corresponding filter coefficient of the predictive filter. Conversely, when the difference even numbered image is selected in the image selecting unit 140, the image encoding unit 150 may encode the odd numbered image, the difference even numbered image, and the corresponding filter coefficient of the predictive filter.

In this instance, as the filter coefficient of the predictive filter is optimized, a magnitude of the difference odd numbered image and/or of the difference even numbered image may have a value nearly approaching zero. That is, as the magnitude of the difference odd numbered image or of the difference even numbered image are reduced, the magnitude of data that would need to be encoded and transmitted for the input image may be effectively reduced.

Also, the image encoding unit 150 may further encode the division index indicating a vertical direction having a high correlation in the pixel values of the input image.

Figure 4:
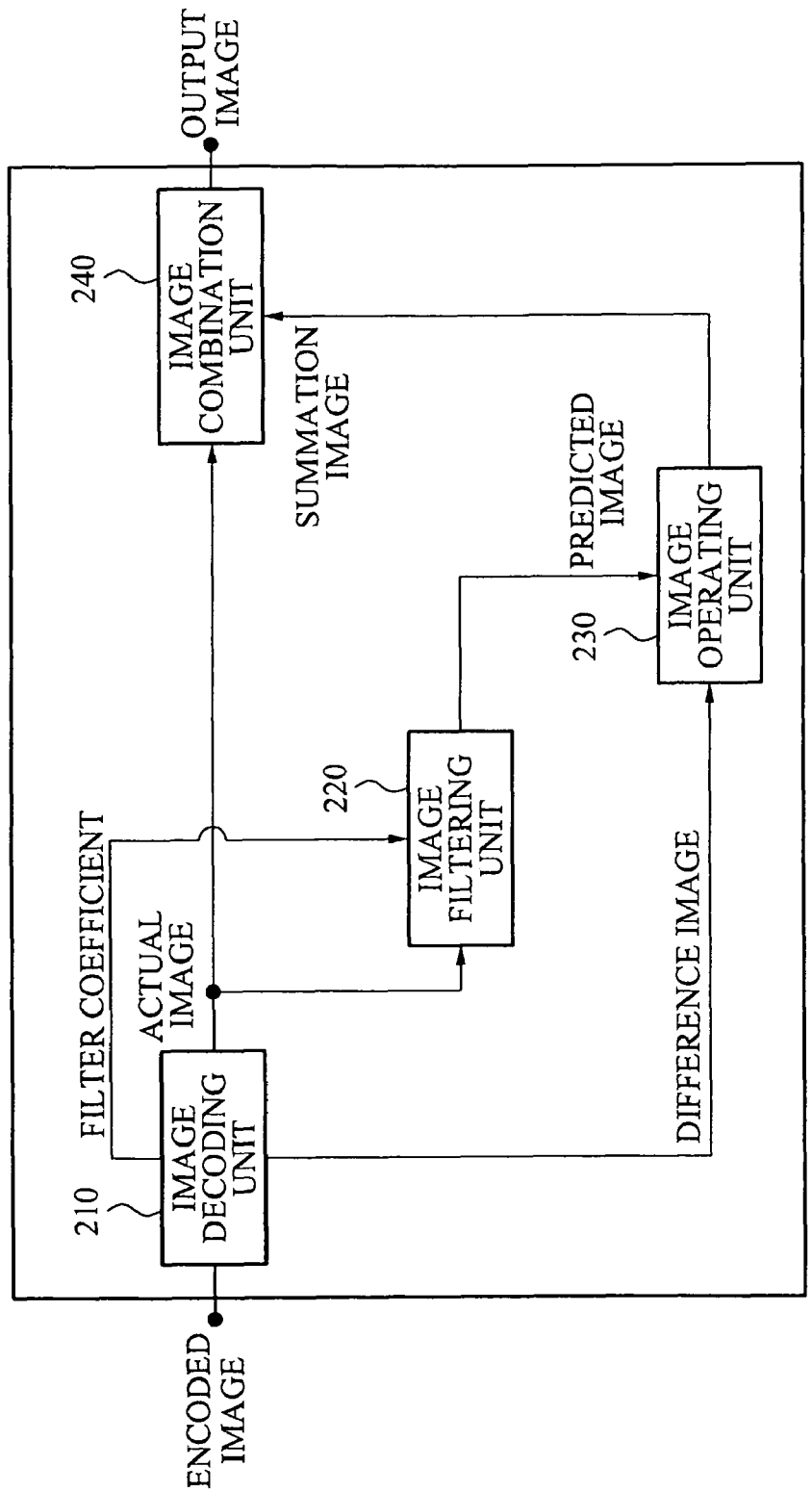
FIG. 4 illustrates a decoding apparatus, according to one or more embodiments.

FIG. 4 illustrates a decoding apparatus, according to one or more embodiments. FIG. 4 corresponds to the case where an odd numbered image and an even numbered image are generated as a plurality of actual images from an input image in the image encoder, according to an embodiment, and where the odd numbered image, a difference even numbered image, that is, a difference image with respect to the even numbered image, and a filter coefficient are encoded. When an encoded image is input to the image decoder, according to an embodiment, the image decoder 210 may decode the odd numbered image, the difference even numbered image, and the filter coefficient. In this instance, the odd numbered image may include an odd numbered column or line in a pixel unit. These columns or lines may be verified using the division index which is further decoded in the image decoder 210.

The image filtering unit 220 may predictive-filter the odd numbered image using the filter coefficient in the predictive filter to generate a predicted even numbered image. In this instance, the image operating unit 230 may generate a summation image using the predicted even numbered image and the difference even numbered image.

In this instance, the image combination unit 240 may combine the odd numbered image and the summation image to generate an original input image. That is, when the summation image is identical to the even numbered image, and the odd numbered image and the even numbered image are combined, the original input image may be obtained.

Figure 5:
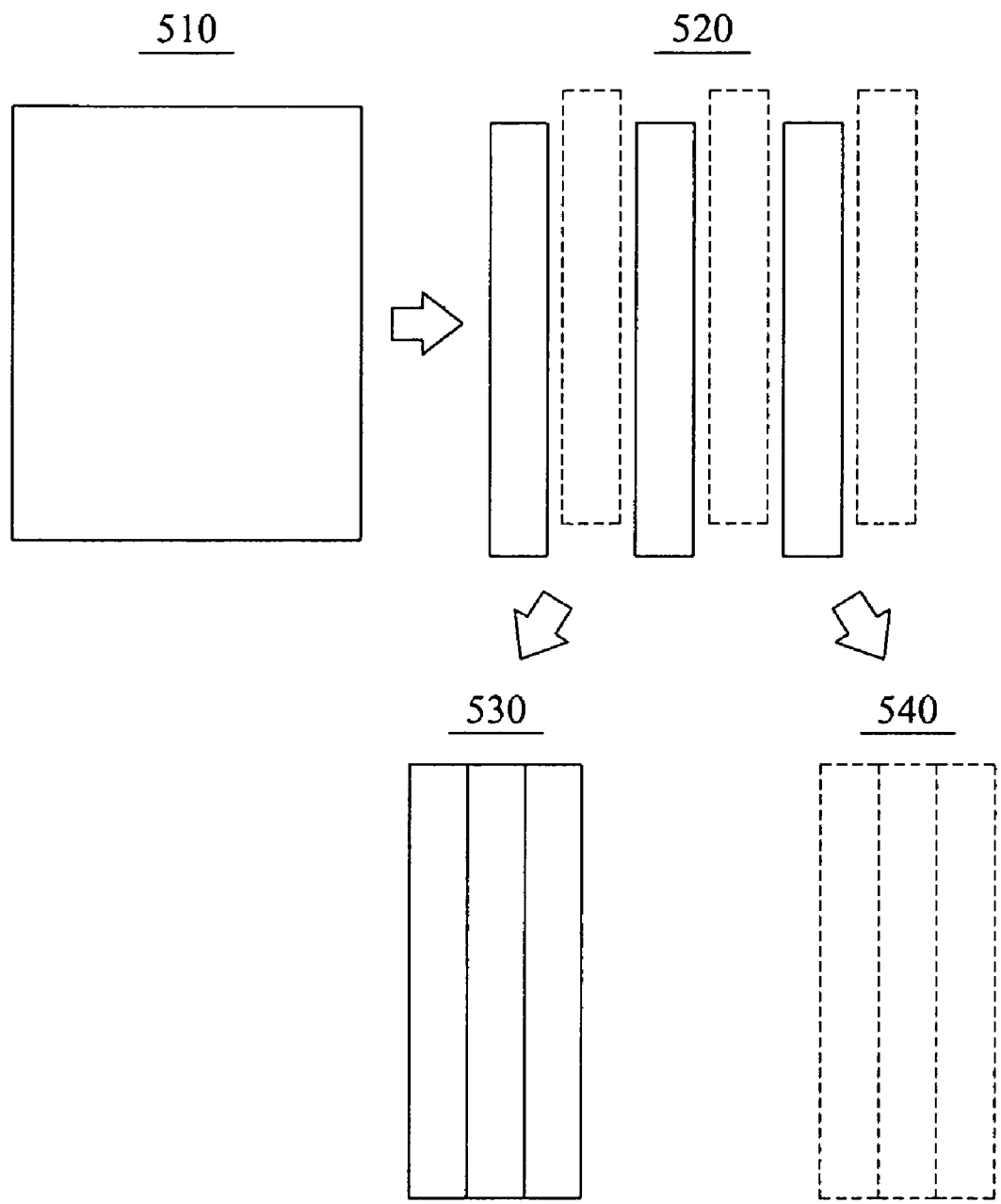
FIG. 5 illustrates a process of generating two actual images from an input image, according to one or more embodiments.

FIG. 5 illustrates a process of generating two actual images from an input image, according to one or more embodiments. In FIG. 5, an input image 510 is divided into a plurality of areas 520 of odd numbered column areas (shown as solid lines) and even numbered column areas (shown as dashed lines). Also, in FIG. 5, the odd numbered column areas are grouped to generate an odd numbered image 530, and the even numbered column areas are grouped to generate an even numbered image 540. Conversely, when a correlation of pixel values of the input image 510 is high in a vertical direction, the input image 510 may be divided into odd numbered line areas and even numbered line areas.

Figure 6:
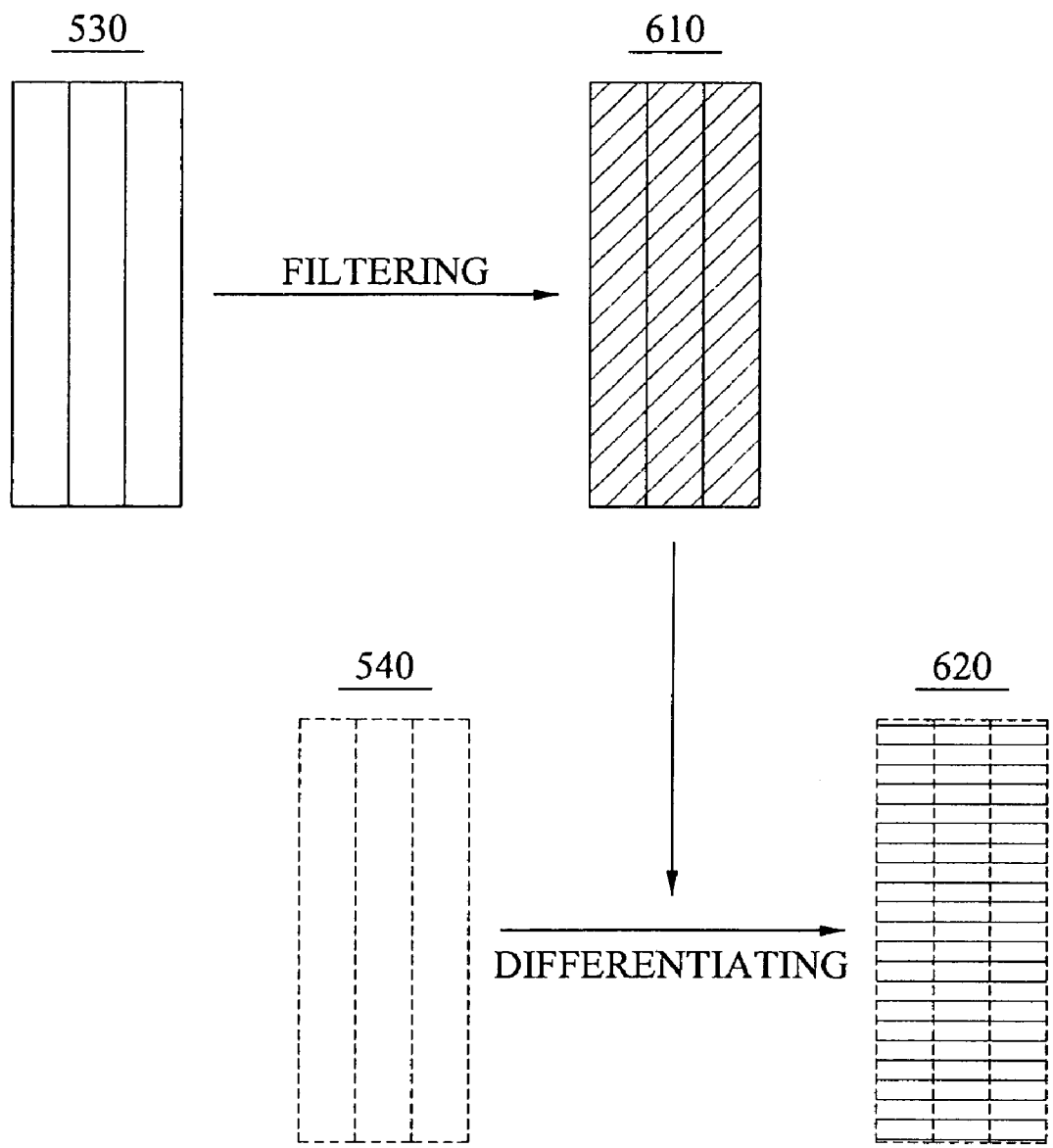
FIG. 6 illustrates a process of generating a difference image, according to one or more embodiments.

FIG. 6 illustrates a process of generating a difference image, according to one or more embodiments. In FIG. 6, the odd numbered image 530 is filtered using a predictive filter to generate a predicted even numbered image 610, and a difference even numbered image 620 is generated by differentiating the predicted even numbered image 610 and the even numbered image 540.

Figure 7:
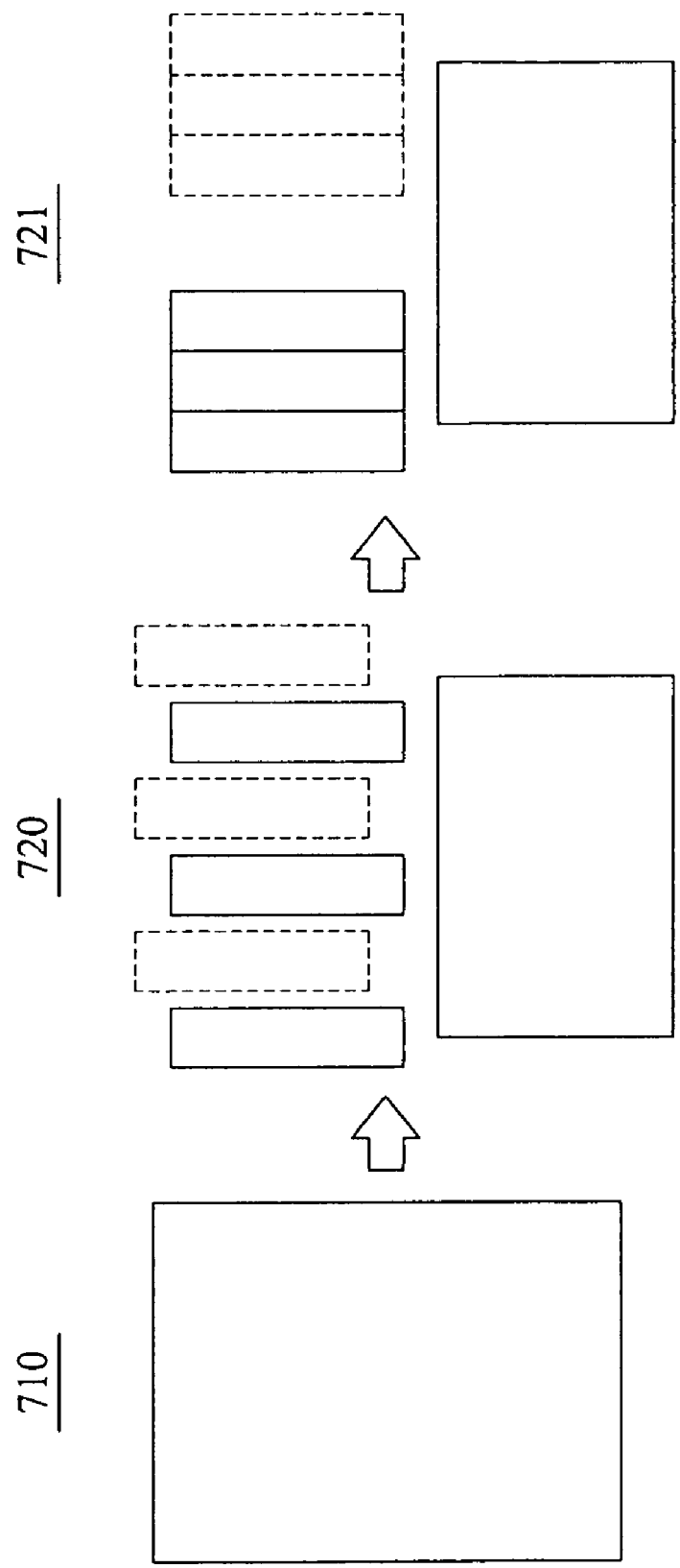
FIG. 7 illustrates a process of generating three actual images from an input image, according to one or more embodiments.

FIG. 7 illustrates an alternative process of generating three actual images from an input image, according to one or more embodiments. In FIG. 7, when a correlation of pixel values of an input image 710 is significantly high in an upper portion of the input image 710 in a vertical direction, while the correlation is insignificant in a lower portion of the input image 710 regardless of a specific direction, the input image 710 may be divided into a plurality of areas 720 illustrated in FIG. 7, and consequently divided into three actual images 721. That is, the upper portion of the input image 710 may be divided into first and second actual images similar to the odd and even division shown in FIG. 5, and the lower portion thereof may divided into a third actual image. In this case, a filtering and differentiating only between the first and second actual images of the upper portion of the input image 710 may be performed.

Figure 8:
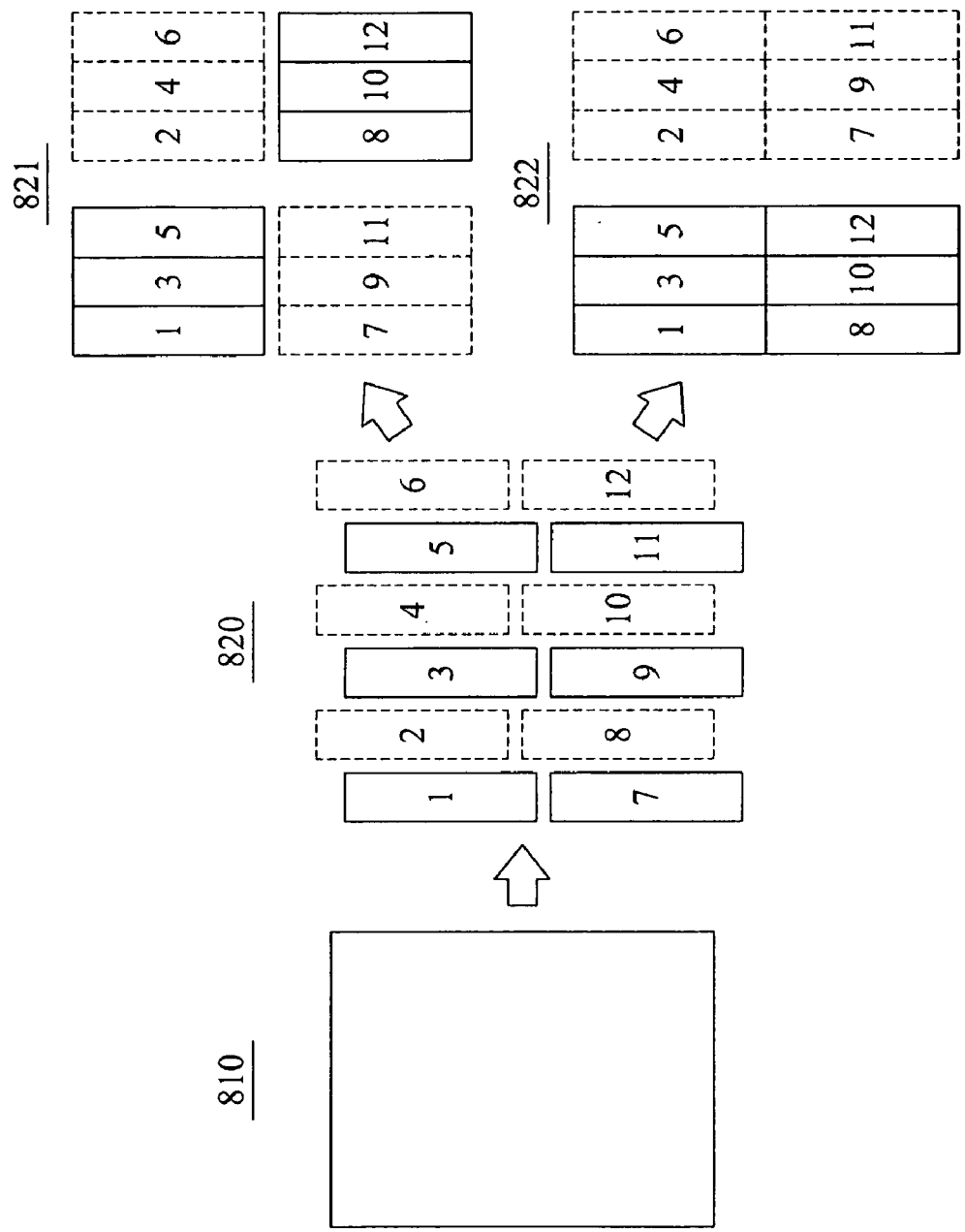
FIG. 8 illustrates a process of generating a plurality of actual images from an input image, according to one or more embodiments.

FIG. 8 illustrates another process of generating a plurality of actual images from an input image, according to one or more embodiments. In FIG. 8, an input image 810 is divided into twelve areas 820 based on a correlation, and is divided into four actual images 821 or two actual images 822, when used.

That is, as illustrated in FIGS. 5, 7, and 8, the input image may be diversely divided into a plurality of areas based on a direction, e.g., a determined direction, where a correlation of pixel values of the input image is high using at least one of variance information and edge information with respect to the pixel values, or when used, and the divided plurality of areas may be diversely combined to generate a plurality of actual images.

Figure 9:
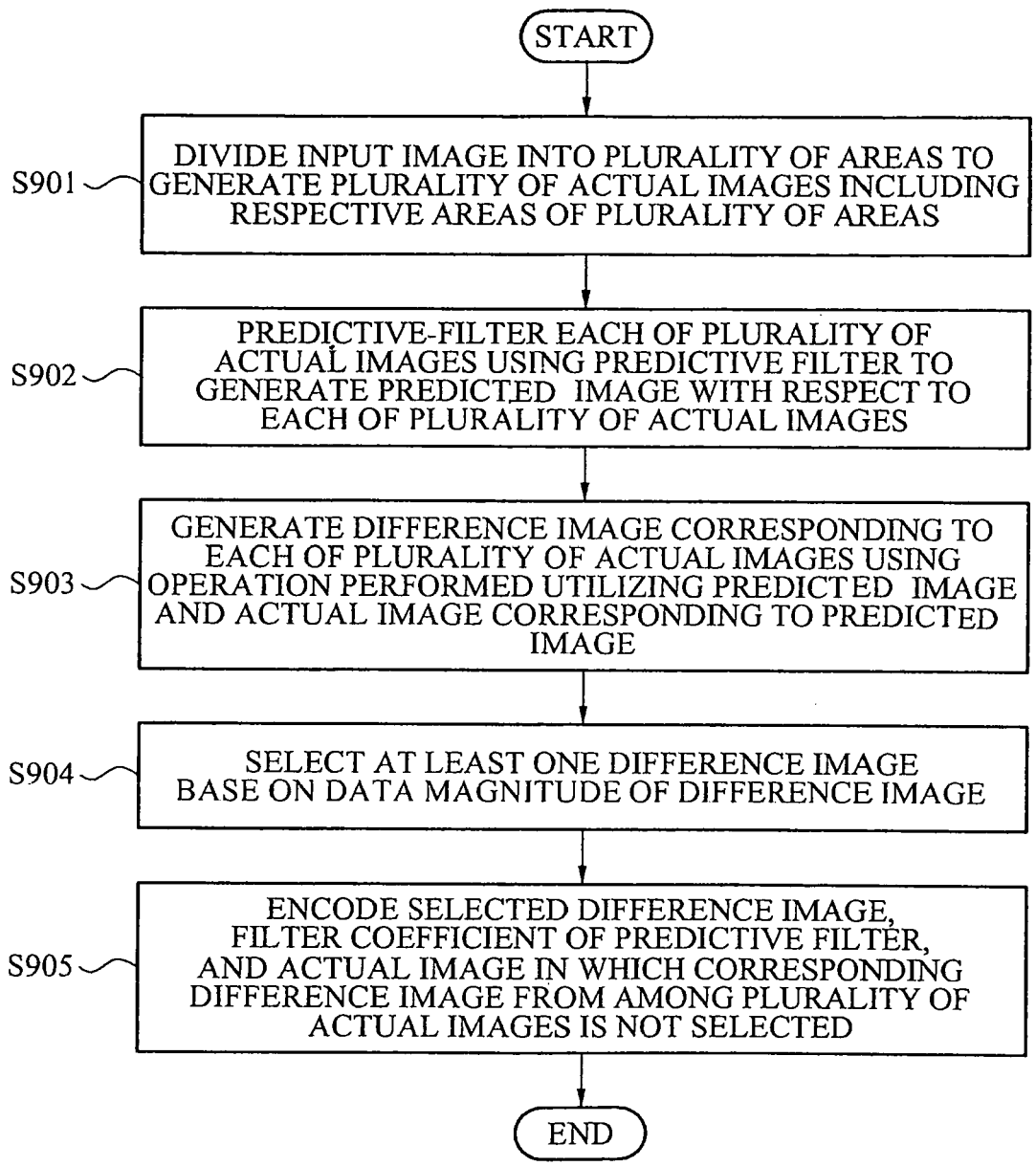
FIG. 9 is a flowchart illustrating an image encoding method, according to one or more embodiments.

FIG. 9 is a flowchart illustrating an image encoding method, according to one or more embodiments. As described above, in an embodiment, the image encoding method may be performed by the image encoder 100 of FIG. 1, as only an example.

In operation S901, an input image is divided into a plurality of areas to generate a plurality of actual images, including the respective areas being different from each other, for example. In this instance, a direction having a high correlation of pixel values of the input image may be determined using at least one of variance information and edge information with respect to the pixel values of the input image. Also, the input image may be divided into the plurality of areas based on the direction having the high correlation, and generate a plurality of actual images in order to enable areas adjacent to each other in the input image from among the plurality of areas to be included in the respective actual images being different from each other. For example, when the pixel values of the input image have a high correlation in a vertical or horizontal direction, a corresponding direction may be determined where the correlation is high in the vertical or horizontal direction. Also, the input image may then be divided in the corresponding vertical or horizontal direction in a pixel unit to generate two actual images including each of an odd numbered column or line area, and an even numbered column or line area.

The input image may be divided into at least two actual images. For convenience of description, it is assumed that the input image is divided into an odd numbered image including the odd numbered column or line of the pixel unit and an even numbered image including the even numbered column or line of the pixel unit, as the two actual images.

In operation S902, each of the plurality of actual images is predictive filtered using a predictive filter to generate a predicted image with respect to each of the plurality of actual images. For example, after generating the odd numbered image and the even numbered image by dividing the input image, the odd numbered image may be predictive filtered to generate a predicted even numbered image with respect to the even numbered image, and the even numbered image may be predictive filtered to generate a predicted odd numbered image with respect to the odd numbered image. In this instance, a corresponding filter coefficient of the predictive filter, which can respectively best predict each of the plurality of actual images, and the predictive filter to which the filter coefficient is applied may be adopted to generate the predicted image with respect to each of the plurality of actual images.

In operation S903, a difference image may be generated corresponding to each of the plurality of actual images using an operation performed utilizing the predicted image and the actual image corresponding to the predicted image. In this instance, the difference image may be generated using pixel values of mutually corresponding pixels in the input image with respect to the predicted image and the actual image. That is, difference images may be generated by differentiating the pixel values of the mutually corresponding pixels from among pixel values of the predicted images and pixel values of the actual images respectively corresponding to the predicted images. In this case, when the predicted even numbered image, generated using the odd numbered image, is completely identical to the even numbered image, a difference between the even numbered image and the predicted even numbered image may be zero. Thus, as a performance of the predictive filter becomes more optimized, the amount of data needed for the difference image may be reduced, and a second actual image may be nearly completely restored using a first actual image when performing a decoding with respect to the input image.

Also, a difference image may be generated with respect to different actual images from among the plurality of actual images. That is, in an embodiment, it is assumed that the odd numbered image and the even numbered image are generated as the plurality of actual images, and the predicted odd numbered image and the predicted even numbered image are generated through the even numbered image and the odd numbered images, respectively. In this instance, a difference odd numbered image may be generated using an operation performed utilizing the odd numbered image and the predicted odd numbered image, and also a difference even numbered image may be generated using an operation performed utilizing the even numbered image and the predicted even numbered image.

In operation S904, at least one difference image may be selected based on respective data magnitudes of the difference images. That is, the appropriate difference image may be selected according to which of the difference odd numbered image and the difference even numbered image has a smaller data magnitude.

In operation S905, the selected difference image, a filter coefficient of the predictive filter, and an actual image may be encoded. Here, this actual image corresponds to a difference image not selected. That is, the image encoder 100 may encode a portion of the actual images from the plurality of actual images, a difference image with respect to the remaining actual images not encoded, and a filter coefficient, rather than encode the entire input image.

For example, the even numbered image, the difference odd numbered image, and the corresponding filter coefficient of the predictive filter may be encoded when the difference odd numbered image is selected, and the odd numbered image, the difference even numbered image, and the corresponding filter coefficient of the predictive filter may be encoded when the difference even numbered image is selected.

In this instance, the difference image may be an image obtained by differentiating the predicted image from the actual image. Here, a data magnitude of the difference image is less than that of the actual image, and a data magnitude of the filter coefficient is significantly less than those of the actual images, and thereby an amount of data to be transmitted may be reduced. For example, when one of the predicted images and the corresponding actual image are completely identical to each other due to a significantly excellent or optimized performance of the predictive filter, the magnitude of a corresponding difference image will be zero. Here, an encoding may thus be performed only with respect to the one of the actual images and the corresponding filter coefficient, thereby reducing an amount of data to be encoded by half.

In this instance, a division index may further be encoded, indicating a direction having a high correlation and an image index designating each of the plurality of actual images. The division index and the image index may be used in verifying a direction in which the input image is divided in an image decoder according to one or more embodiments, and in verifying that the difference image with respect to which actual image is encoded.

Figure 10:
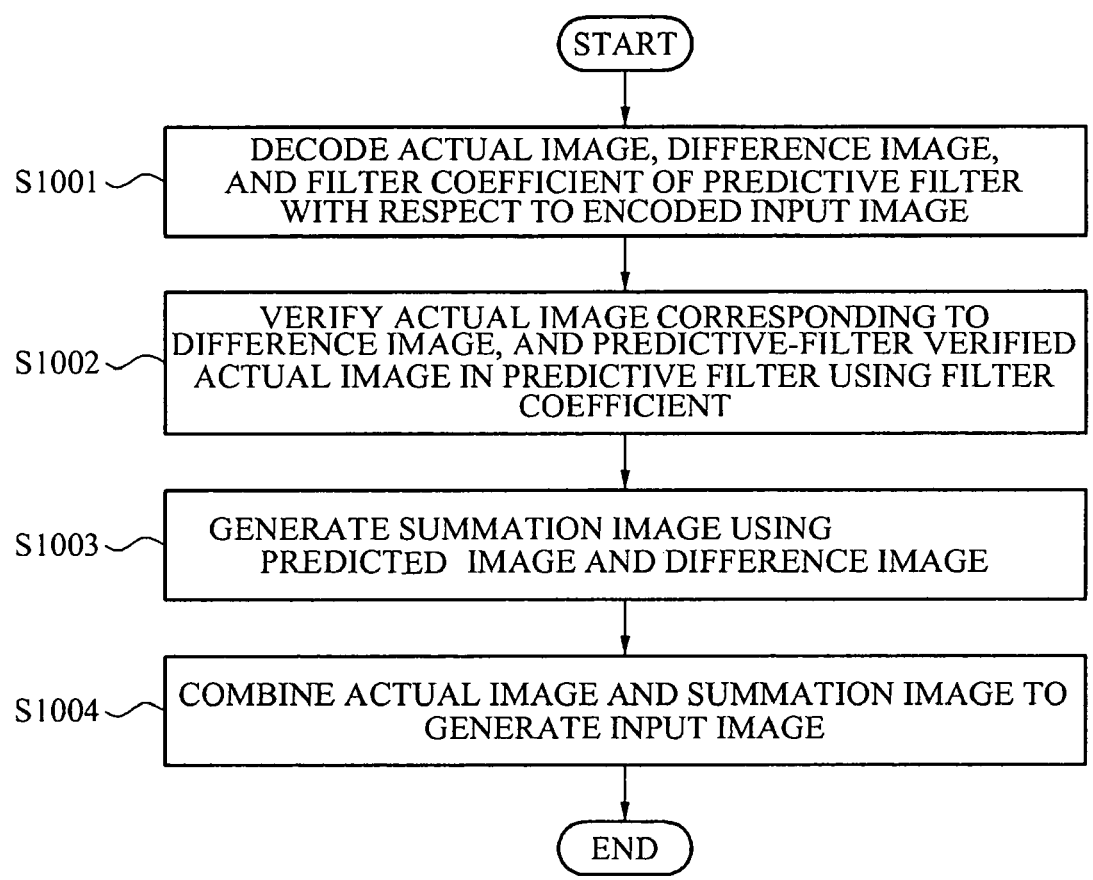
FIG. 10 is a flowchart illustrating an image decoding method, according to one or more embodiments.

FIG. 10 is a flowchart illustrating an image decoding method, according to one or more embodiments. The image decoding method, according to an embodiment, may be performed by the image decoder 200 of FIG. 2, for example.

In operation S1001, an actual image, a difference image, and a filter coefficient of a predictive filter, with respect to an encoded input image, are decoded. In a similar manner as described with reference to FIG. 9, an even numbered image, a difference odd numbered image, and a corresponding filter coefficient of the predictive filter may be decoded, or an odd numbered image, a difference even numbered image, and a corresponding filter coefficient of the predictive filter may be decoded. That is, the actual image may be any one of an odd numbered image including an odd numbered column or line in a pixel unit and an even numbered image including an even numbered column or line in a pixel unit. Also, the difference image may be a difference even numbered image when the encoded actual image is the odd numbered image, and may be a difference odd numbered image when the encoded actual image is the even numbered image.

In this instance, a division index and image index may be decoded, with the division index indicating a direction having a high correlation of pixel values of the input image and the image index designating each of the plurality of actual images. That is, a direction in which the input image is divided may be verified using the division index, and which image from among the plurality of actual images is encoded may be verified using the image index. For example, when the image index is expressed as {1, 2, 3, 4} indicating the plurality of actual images, and the image index expressed as {1, 3} is encoded, an actual image corresponding to '1' and '3' may be verified using a decoded {1, 3} and a decoded difference image corresponding to '2' and '4'. In this instance, a predicted image corresponding to '2', derived from the actual image corresponding to '1', and a difference image corresponding to '2' would be images that correspond to each other. Accordingly, the actual image corresponding to '1' would further be adjacent to a decoder generated image corresponding to '2', derived from the predicted image corresponding to '2' and the difference image corresponding to '2', for example.

As a performance of the predictive filter becomes more excellent or optimized, the even numbered image using the odd numbered image or the odd numbered image using the even numbered image may be accurately predicted. That is, as the performance of the predictive filter becomes more excellent or optimized, a magnitude of the difference image may approach zero. Thus, when the difference image approaches zero, another actual image may be obtained using only one transmitted actual image, thereby significantly reducing a magnitude of data to be encoded/decoded or transmitted. That is, when a magnitude of the difference image is zero with respect to the input image in which two actual images are generated, the entire input image may be generated in a receiving end, even though only any one of the example odd numbered image and the even numbered image, and the filter coefficient, are encoded and transmitted.

In operation S1002, an actual image corresponding to the difference image may be verified, and the verified actual image may be predictive filtered using the filter coefficient to generate a predicted image. For example, the odd numbered image may be predictive filtered when the actual image includes the odd numbered image, and a predicted even numbered image may be generated as the predicted image. Also, the even numbered image may be predictive filtered when the actual image includes the even numbered image, and a predicted odd numbered image may be generated as the predicted image.

In operation S1003, a summation image may be generated using the predicted image and the difference image. For example, the summation image may be generated by either using a summation performed between a pixel value of the predicted even numbered image and a pixel value of the difference even numbered image, or using a summation performed between a pixel value of the predicted odd numbered image and a pixel value of the difference odd numbered image. That is, the summation image may designate an original odd numbered image or an original even numbered image, for example.

In operation S1004, the actual image and the summation image may further be combined to regenerate an original input image. That is, when the odd numbered image, the difference image with respect to the even numbered image, and the filter coefficient are decoded, a predicted even numbered image may be generated from the odd numbered image. In this instance, as the summation image, the even numbered image may be generated using operation performed utilizing the predicted even numbered image and the difference image. In this instance, the original input image may be generated by combining the odd numbered image and the generated even numbered image.

As described above, according to one or more embodiments, a plurality of actual images with respect to an input image may be generated, and a difference image capable of predicting another actual image using one actual image may be generated, thereby reducing an amount of data, and effectively encoding a large capacity image.

According to one or more embodiments, a predicted image with respect to another actual image may be generated by predictive-filtering one actual image, and a difference image excluding the predicted image from the other actual image may be generated and encoded, thereby effectively encoding a large capacity image.

According to one or more embodiments, an input image of which only a partial area is encoded may be decoded, and an image of another area may be generated by predictive-filtering the image of the partial area using a predictive filter, thereby effectively encoding a large capacity image.

The above described methods may be recorded, stored, or fixed in one or more computer-readable storage media that includes computer readable code, e.g., program instructions, to control at least one processing device, such as a processor or computer, to execute or perform the example program instructions. The media may also include, in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image encoding apparatus, comprising:
   an image dividing unit to generate a plurality of actual images of respective areas divided from an input image, the respective areas being different from each other;
   an image filtering unit to predictive-filter each of the plurality of actual images using a predictive filter to generate a predicted image with respect to each of the plurality of actual images;
   an image operating unit to generate a difference image corresponding to each of the plurality of actual images based on respective comparisons of the predicted images and the actual images corresponding to the predicted images;

an image selecting unit to select at least one difference image, of the generated difference images, based on respective data magnitudes of the difference images; and an image encoding unit to encode the selected difference image, a filter coefficient of the predictive filter corresponding to a predicted image used to generate the selected difference image, and an actual image, from among the plurality of actual images, in which a corresponding difference image is not selected by the image selecting unit.

2. The image encoding apparatus of claim 1, wherein the image dividing unit includes:

a correlation checking unit to determine a direction where a correlation of pixel values of the input image is high using at least one of variance information and edge information with respect to the pixel values; and a field extracting unit to divide the input image into a plurality of areas, each corresponding to a respective actual image, based on the direction where the correlation is high, and to generate the plurality of actual images to enable areas adjacent to each other in the input image to be included in different actual images.

3. The image encoding apparatus of claim 2, wherein the image encoding unit further encodes a division index indicating the direction where the correlation is high and an image index designating each of the plurality of actual images.

4. The image encoding apparatus of claim 1, wherein each of the plurality of actual images is one of an odd numbered image, including an odd numbered column or line of a pixel unit of the input image, and an even numbered image, including an even numbered column or line of the pixel unit of the input image, and the image filtering unit predictive-filters the odd numbered image to generate, as a corresponding predicted image used in a corresponding difference image generation, a predicted even numbered image with respect to the even numbered image, and predictive-filters the even numbered image to generate, as the corresponding predicted image used in the corresponding difference image generation, a predicted odd numbered image with respect to the odd numbered image.

5. The image encoding apparatus of claim 4, wherein the image operating unit generates a difference odd numbered image based on a determined difference between a pixel value of the odd numbered image and a pixel value of the predicted odd numbered image, and generates a difference even numbered image based on a determined difference between a pixel value of the even numbered image and a pixel value of the predicted even numbered image, and the image selecting unit selects any one of the difference odd numbered image and the difference even numbered image based on respective data magnitudes of the difference odd numbered image and the difference even numbered image.

6. The image encoding apparatus of claim 5, wherein the image encoding unit encodes one of the even numbered image, the difference odd numbered image, and a filter coefficient of the predictive filter for the predicted image corresponding to the selected difference odd numbered image, and the odd numbered image, the difference even numbered image, and a filter coefficient of the predictive filter for the predicted image corresponding to the selected difference even numbered image.

7. An image encoder encoding a portion of an input image, a difference image corresponding to a comparison between the portion of the input image and a prediction of another portion of the input image derived from predictive filtering the portion of the input image, and a filter coefficient of a predictive filter performing the predictive filtering of the portion of the input image, such that a decoder regenerates the input image by predictive filtering a decoding of the portion of the input image, from a bitstream, based on the filter coefficient and adding the decoded portion of the input image to a combination of a decoding of the difference image, from the bitstream, and the predictive filtered decoded portion of the input image.

8. The image encoder of claim 7, wherein the difference image is a non-zero image.

9. An image decoding apparatus, comprising:

an image decoding unit to decode an actual image, a difference image, and a filter coefficient of a predictive filter, with respect to an encoded input image represented by the actual image;

the predictive filter to predictive-filter the actual image using the filter coefficient;

an image operating unit to generate a summation image based on the predicted image and the difference image; and an image combination unit to combine the actual image and the summation image to regenerate the input image.

10. The image decoding apparatus of claim 9, wherein the actual image includes any one of an odd image, including an odd numbered column or line of a pixel unit of the input image, and an even numbered image, including an even numbered column or line of a pixel unit of the input image.

11. The image decoding apparatus of claim 10, wherein the predictive filter predictive-filters the odd numbered image to generate a predicted even numbered image as the predicted image, when the actual image is the odd numbered image, and predictive-filters the even numbered image to generate a predicted odd numbered image as the predicted image, when the actual image is the even numbered image.

12. The image decoding apparatus of claim 11, wherein the image operating unit generates the summation image by using one of a summation performed between a pixel value of the predicted even numbered image and a pixel value of the difference image and a summation performed between a pixel value of the predicted odd numbered image and a pixel value of the difference image.

13. An image encoding method, comprising:

generating a plurality of actual images of respective areas divided from an input image, the respective areas being different from each other;

predictive-filtering each of the plurality of actual images to generate a predicted image with respect to each of the plurality of actual images;

generating a difference image corresponding to each of the plurality of actual images based on respective comparisons of the predicted images and the actual images corresponding to the predicted images;

selecting at least one difference image, of the generated difference images, based on respective data magnitudes of the difference images; and encoding the selected difference image, a filter coefficient for predictive-filtering corresponding to a predicted image used to generate the selected difference image, and an actual image, from among the plurality of actual images, in which a corresponding difference image is not selected for encoding.

14. The image encoding method of claim 13, wherein the generating of the plurality of actual images further comprises correlation checking the input image to determine a direction where a correlation of pixel values of the input image is high using at least one of variance information and edge information with respect to the pixel values, dividing the input image into a plurality of areas, each corresponding to a respective actual image, based on the direction where the correlation is high, and generating the plurality of actual images to enable areas adjacent to each other in the input image to be included in different actual images.

15. The image encoding method of claim 14, wherein the image encoding further comprises encoding a division index indicating the direction where the correlation is high and an image index designating each of the plurality of actual images.

16. The image encoding method of claim 13, wherein each of the plurality of actual images is one of an odd numbered image, including an odd numbered column or line of a pixel unit of the input image, and an even numbered image, including an even numbered column or line of the pixel unit of the input image, and the predictive-filtering includes predictive-filtering the odd numbered image to generate, as a corresponding predicted image used in a corresponding difference image generation, a predicted even numbered image with respect to the even numbered image, and predictive-filtering the even numbered image to generate, as the corresponding predicted image used in the corresponding difference image generation, a predicted odd numbered image with respect to the odd numbered image.

17. The image encoding method of claim 16, wherein the generating of the difference image further comprises generating the difference odd numbered image based on a determined difference between a pixel value of the odd numbered image and a pixel value of the predicted odd numbered image, and generating a difference even numbered image based on a determined difference between a pixel value of the even numbered image and a pixel value of the predicted even numbered image, and wherein the selecting of the at least one difference image further comprises selecting any one of the difference odd numbered image and the difference even numbered image, as the selected difference image, based on respective data magnitudes of the difference odd numbered image and the difference even numbered image.

18. The image encoding method of claim 17, wherein the encoding of the selected difference image further comprises encoding one of the even numbered image, the difference odd numbered image, and a filter coefficient of the predictive-filtering for the predicted image corresponding to the selected difference odd numbered image, and the odd numbered image, the difference even numbered image, and a filter coefficient of the predictive-filtering for the predicted image corresponding to the selected difference even numbered image.

19. An image encoding method, comprising encoding a portion of an input image, a difference image corresponding to a comparison between the portion of the input image and a prediction of another portion of the input image derived from predictive filtering the portion of the input image, and a filter coefficient for performing the predictive filtering of the portion of the input image, such that a decoding method regenerates the input image by predictive filtering a decoding of the portion of the input image, from a bitstream, based on the filter coefficient and adding the decoded portion of the input image to a combination of a decoding of the difference image, from the bitstream, and the predictive filtered decoded portion of the input image.

20. The image encoding method of claim 19, wherein the difference image is a non-zero image.

21. An image decoding method, comprising:
decoding an actual image, a difference image, and a filter coefficient of a predictive filter, with respect to an encoded input image represented by the actual image;
predictive-filtering the actual image using the filter coefficient;
generating a summation image based on the predicted image and the difference image; and
combining the actual image and the summation image to regenerate the input image.

22. The image decoding method of claim 21, wherein the actual image includes any one of an odd image, including an odd numbered column or line of a pixel unit of the input image, and an even numbered image, including an even numbered column or line of a pixel unit of the input image.

23. The image decoding method of claim 22, wherein the predictive-filtering further comprises predictive-filtering the odd numbered image to generate a predicted even numbered image as the predicted image, when the actual image is the odd numbered image, and predictive-filtering the even numbered image to generate a predicted odd numbered image as the predicted image, when the actual image is the even numbered image.

24. The image decoding method of claim 23, wherein the generating of the summation image further comprises generating the summation image by using one of a summation performed between a pixel value of the predicted even numbered image and a pixel value of the difference image and a summation performed between a pixel value of the predicted odd numbered image and a pixel value of the difference image.

25. At least one non-transitory computer readable medium storing computer readable code to control at least one processing device to implement the method of claim 13.

26. At least one non-transitory computer readable medium storing computer readable code to control at least one processing device to implement the method of claim 19.

27. At least one non-transitory computer readable medium storing computer readable code to control at least one processing device to implement the method of claim 21.

* * * * *